Feb. 11, 1930. C. C. CODY 1,747,052
AGRICULTURAL IMPLEMENT
Filed April 25, 1927 2 Sheets-Sheet 1

INVENTOR.
C. C. Cody,
BY
ATTORNEY.

Feb. 11, 1930. C. C. CODY 1,747,052
AGRICULTURAL IMPLEMENT
Filed April 25, 1927 2 Sheets-Sheet 2
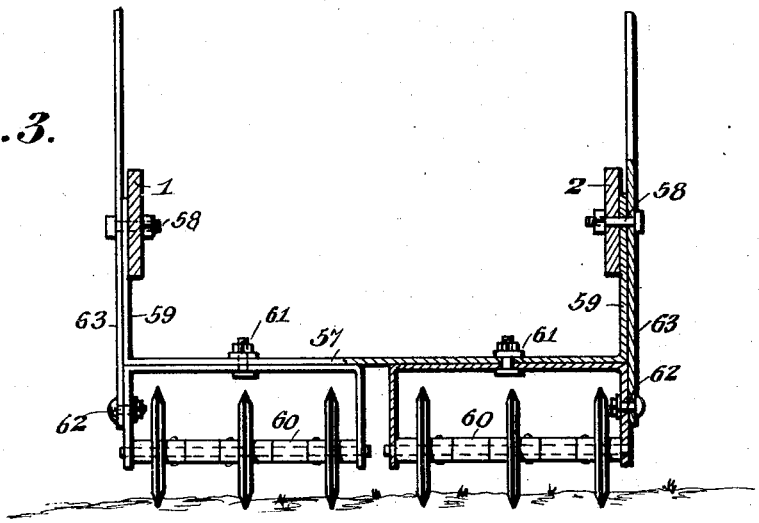
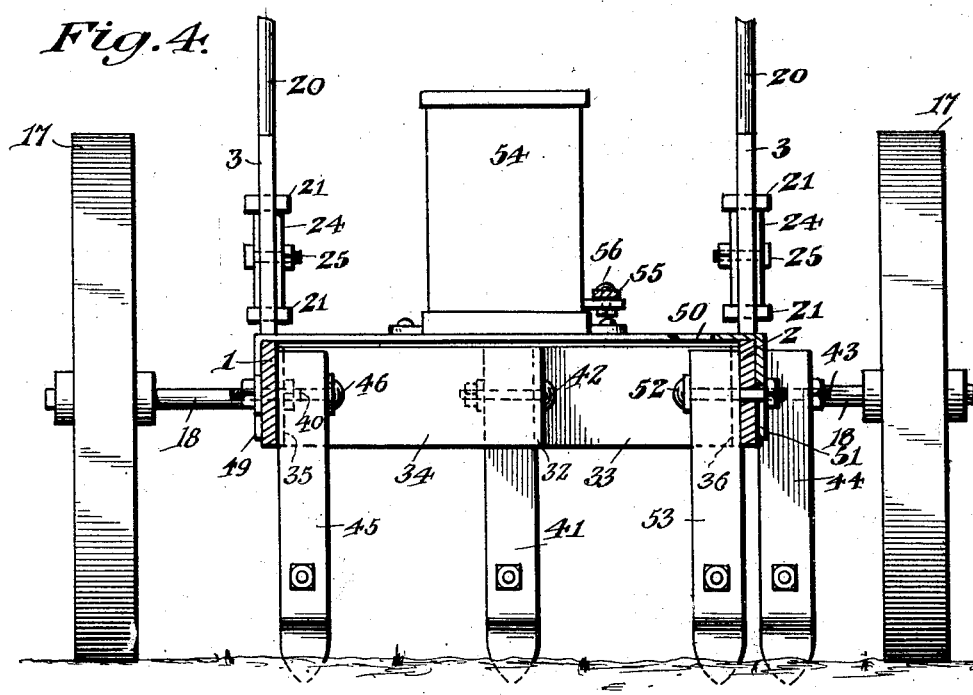
INVENTOR.
C. C. Cody,
BY
Geo. F. Kimmel. ATTORNEY.

Patented Feb. 11, 1930

1,747,052

UNITED STATES PATENT OFFICE

CULLY C. CODY, OF TREMONT, MISSISSIPPI

AGRICULTURAL IMPLEMENT

Application filed April 25, 1927. Serial No. 186,370.

This invention relates to agricultural machines, and has for its object to provide, in a manner as hereinafter set forth, a machine of such class with means for cultivating and harrowing the soil, for distributing fertilizer, for planting, and for stalk cutting.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 3 is a section on line 3—3, Figure 2.

Figure 4 is a section on line 4—4, Figure 2.

Figure 1:
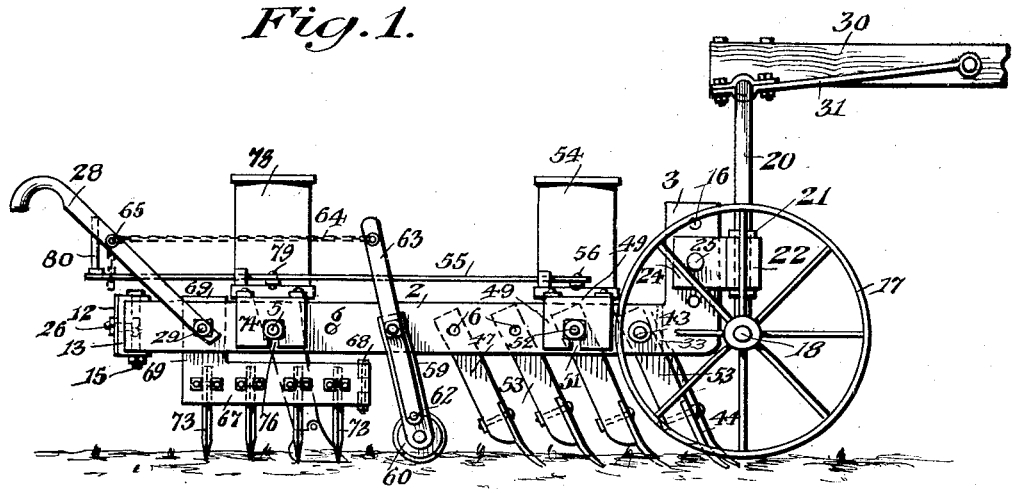
Figure 1 is a side elevation of an agricultural machine in accordance with this invention.
Figure 2:
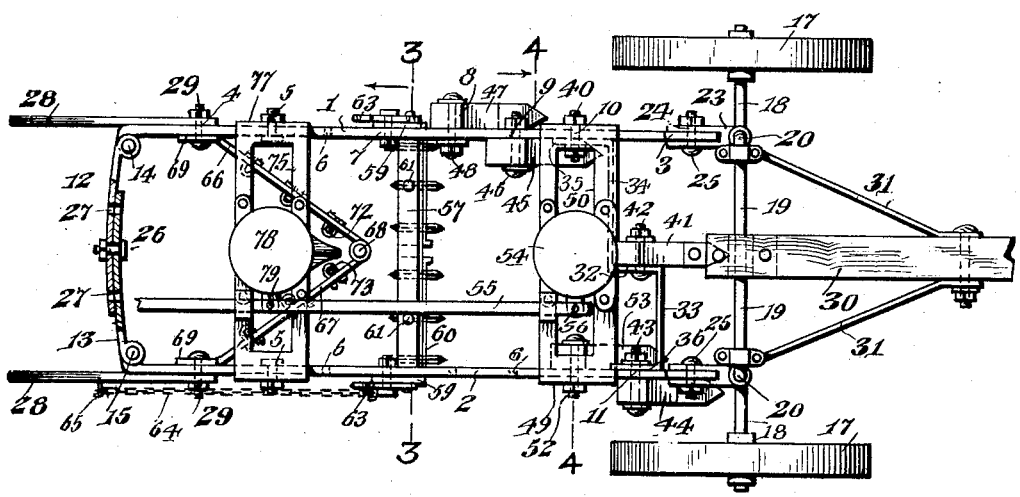
Figure 2 is a top plan view thereof.
Figure 5:
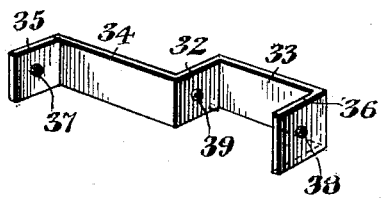
Figure 5 is a perspective view of a cultivator shovel carrier.

Referring to the drawings, the machine includes a frame consisting of a pair of complemental side members 1, 2, each provided at its forward end with a vertically disposed extension 3 which projects at right angles to its respective side member and is of appropriate height. Each side member is formed with a series of spaced openings 4, 5, 6, 7, 8, 9 and 10 and with the openings in one side member aligning with the openings in the other side member. The side member 2 in advance of its opening 10 is formed with an opening 11. The frame further includes a back member formed of two sections indicated at 12, 13, and the former is hinged, as at 14, to the rear end of the side member 1, and at 15 to the rear end of the side member 2. Each extension 3 is formed with a series of spaced openings 16 and with the openings in one extension aligning with the openings in the other extension.

The forward end of the frame is supported upon a pair of traction wheels 17 mounted on the ends 18 of an arched axle 19. The vertical portions 20 of the axle 19 extend down through flanged bearing sleeves 21, which are mounted in connecting members 22 projecting forwardly from the extensions 3 and adjustably connected therewith. Each of the connecting members 22 has its forward end provided with an opening for the mounting of the sleeve 21 therein, and the rear portion of each connecting member 22 is bifurcated, as at 23, for straddling an extension 3. The bifurcated portion of the connecting member 22 is apertured, as at 24, and which is adapted to register with an opening 16. A hold-fast device 25 is employed for detachably securing a connecting member 22 to an extension 3. The foregoing construction provides for the swinging outwardly relative to each other the side members 1 and 2, and these latter are connected together in set position by a removable hold-fast device 26, which couples the sections 12 and 13 of the back member together. A set of openings 27 is provided in each of the sections 12, 13 of the back member and which in connection with the hold-fast device 26 provide means for adjustably connecting said sections together.

Extending rearwardly from the side members 1, 2 are handle members 28 and each of which is connected by a hold-fast device 29 to a side member. The hold-fast device extends through the opening 4 in a side member. Secured to the top of the arched axle 19 is a tongue 30, and connected therewith and to the top of said axle 19 is a pair of oppositely extending brace rods 31 for the tongue.

Arranged between the forward portion of the side members 1, 2, is a carrier for a cultivator shovel and which consists of a metallic strap of substantial width formed to provide a central portion 32, a pair of intermediate portions 33, 34 projecting from the central portion 32 and extending in parallel planes, and a pair of end portions 35, 36, the former merging into the intermediate portion 34 and the latter into the intermediate portion 33. The end portion 35 is of greater length than the end portion 36, and the former is provided with an opening 37 and the latter with an opening 38. The central portion 32 is formed with an opening 39. The end portion 35 is positioned against the inner face of the side member 1 and is secured to the latter by a hold-fast device 40, which extends through the opening 10 in said member 1 and also through the opening 37. Secured against the central portion 32 and interposed between the latter and the side member 1 is a cultivator shovel 41. The securing means for the shovel 41 is indicated at 32 and which extends through the upper end of the stem of the shovel and through the opening 39. The end portion 36 is positioned against the inner face of the side member 2 and is secured therewith by a hold-fast device 43. The latter extends through the opening 38 and also through the opening 11 in the side member 2 and carries a cultivator shovel 44, which is positioned exteriorly of the side member 2 and has its upper end abut against the outer face thereof. Secured against the inner face of the side member 1 and depending from the latter is a cultivator shovel 45, and the securing means for the latter is indicated at 46 and which extends through the upper end of the shovel 45 and through the opening 9 in the side member 1. The shovel 45 is arranged rearwardly of the shovel 41. Positioned against the outer face of the side member 1, as well as depending therefrom, is a cultivator shovel 47 which is arranged rearwardly of the shovel 45. The shovel 47 is secured to the side member 1 by a hold-fast device 48 which extends through the opening 8 in said side member 1 and also through the upper end of the shovel 47.

Mounted upon the side members 1 and 2 forwardly of the hold-fast device 46 is an inverted yoke-shaped support 49 formed with a skeleton top 50. The sides of the support 49 are bifurcated, as at 51, for straddling the hold-fast device 41 and also for straddling a hold-fast device 52 which extends through the opening 10 in the side member 11 and provides means for connecting a cultivator shovel 53 against the inner face of said side member 2 rearwardly with respect to the shovel 44. The hold-fast devices 40 and 52 provide means for detachably connecting the support 49 to the side members 1 and 2. Secured to the top 50 of the support 49, centrally thereof, is a fertilizer distributing mechanism 54 of any suitable construction and which is operated by a rearwardly extending actuating bar 55 pivotally connected with said mechanism, as at 56.

Depending from the side members 1 and 2, rearwardly of the cultivator shovel 47, is a yoke 57, which is pivotally mounted on a pair of hold-fast devices 58 extending through the openings 7 in the side members 1 and 2. The arms 59 of the yoke 57 are arranged exteriorly of the side members 1 and 2. Connected to the yoke 57 and depending therefrom is a pair of harrow elements 60 of the disk type. The connection means between said harrow elements and the yoke 57 are indicated at 61. Connected to each of said harrow elements, as at 62, is an upstanding adjusting bar 63, which is pivotally mounted on a hold-fast device 58 and projects above a side member of the frame of the machine.

One of the bars 63 is connected by a pull chain 64 to one of the handle members 28, and the latter is provided with suitable means, as at 65, to retain the pull chain 64 in position, thereby maintaining the harrow elements 60 in the position to which they have been adjusted.

Arranged between the side members 1, 2, rearwardly with respect to the harrow elements 60, is an adjustable harrow tooth carrier consisting of a pair of oppositely extending sections 66, 67, hinged together at their forward ends, as at 68. The rear end of each of said sections terminates in a vertically disposed plate 69 of a height greater than the width of either of said sections and formed with an opening. The plates 69 are positioned against the inner face of the side members 1 and 2 and are secured therewith by the hold-fast devices 29. The sections 66 and 67 are provided with spaced pairs of openings for the reception of securing devices 72 for connecting the harrow teeth 73 to the carrier.

Positioned over the harrow tooth carrier is an inverted yoke-shaped support 74 having a skeleton top 75. The sides of the support 74 are bifurcated, as at 76, for straddling the hold-fast devices 77 which extend through the openings 5 in the side members 1 and 2 and provide means for detachably connecting the support 74 to the said side members. Secured to the top 75 of the support 74 is a combined seed planter and furrow opener element 78 of any suitable construction and which is operated by the actuating bar 55, the latter being pivotally connected to the element 78 as at 79, and extends beyond the rear of the supporting frame of the machine and is provided with an upstanding handle 80.

What I claim is:—

1. In an agricultural machine, a frame including a pair of spaced, parallel side bars, a transversely disposed, one-piece angled cultivator shovel carrier interposed between and having right angularly disposed end portions secured against the inner faces of said side bars, said carrier including a central part disposed in parallelism with respect to said side bars and positioned to one side of the longitudinal median of the frame, a cultivator shovel positioned against one side of and depending from said central part and further secured to the latter, and cultivator shovels connected against the outer faces of said side bars and one arranged in advance of the other.

2. In an agricultural machine, a frame including a pair of spaced, parallel side bars each provided at its forward end with a vertical extension projecting upwardly therefrom, ground working means carried by said side bars, an arched axle arranged forwardly of and spaced from said extensions and provided with a pair of traction wheels, a pair of rearwardly extending connecting members having their forward ends mounted on the vertical portions of said axles, each of said connecting members having a bifurcated rear portion, said connecting members straddling said extensions, means for adjustably connecting said extensions to said members, and a tongue secured to said axle.

In testimony whereof, I affix my signature hereto.

CULLY C. CODY.